Sept. 15, 1970 R. L. GARRETT 3,528,216

JET PUMP AND SUPERSONIC FLOW SEPARATOR

Filed May 20, 1968

INVENTOR.
ROBERT L. GARRETT,
BY John S. Schneider
ATTORNEY.

United States Patent Office 3,528,216

Patented Sept. 15, 1970

1

2

3,528,216

JET PUMP AND SUPERSONIC FLOW SEPARATOR

Robert L. Garrett, Houston, Tex., assignor to Esso Production Research Company, a corporation of Delaware Filed May 20, 1968, Ser. No. 730,372
Int. Cl. B01d *51/08*
U.S. Cl. 55—15 12 Claims

ABSTRACT OF THE DISCLOSURE

Method and apparatus for separating one or more components from a multicomponent high-pressure gas stream. The gas stream is expanded to supersonic velocities through a supersonic effuser to achieve low temperatures and low pressures in the supersonic gas stream and cause liquid particles (drops) and/or solid particles to form. The supersonic gas stream is made to traverse a planar bend provided with a permeable outer wall to and through which the condensed particles are inertially moved and thereby separated from the gas stream. The separated condensed particles are collected along with dissolved and entrained gas which also separates from the gas stream. The supersonic gas stream is then decelerated to subsonic flow through a diffuser and part of the pressure of the gas stream is recovered. The jet pump principle is employed to introduce low pressure stagnant gas into the supersonic (motive gas) stream where energy and heat transfer occur upon mixing of the two gas streams.

The present invention generally concerns method and apparatus in which high efficiency expansion of a gas stream to supersonic velocities cools the gas stream to form a condensed phase. The condensed phase, particles or drops, is inertially moved to and through a permeable wall as the gas stream traverses a planar bend. A supersonic diffuser located at the end of the bend compresses and decelerates the gas stream to low subsonic velocities. Gas, either entrained or dissolved, in the condensed phase also moves through the permeable wall. The entrained gas and volatile liquid components after treatment in an integrated process are commonly found as stabilizer off-gas.

In many industrial processes in which the separation of condensable components from gas by supersonic expansion cooling is applicable, it is desirable to dispose of low pressure gas by introducing it into a higher pressure system. In such cases, the supersonic expansion separator is peculiarly adaptable for incorporation of the jet pump principle into its flow system where the motive gas is the cold main supersonic gas stream and the low pressure stagnant gas requires compression. Further, introduction of a rich low-pressure gas such as a stabilizer off-gas into the cold motive gas stream causes condensation of the heavier components and their removal along with condensed components of the motive gas stream. In this respect, the inclusion of the jet pump principle broadens the applicability of the supersonic separator by providing two distinct benefits to gas processing: (1) pressuring of a low-pressure gas stream by energy transfer from the motive gas stream; and (2) condensation of components in a low-pressure gas stream by heat transfer with the cold motive gas stream.

The following terms used herein are defined in accordance with general aerodynamic usage:

"Supersonic effuser" means a flow channel having a convergent subsonic section followed by a divergent supersonic section with an intervening sonic throat which functions as an aerodynamic expander.

"Supersonic diffuser" (final diffuser) means a flow channel having a convergent supersonic section followed by a divergent subsonic section with an intervening sonic throat which functions as an aerodynamic compressor.

"First diffuser" means a flow channel reduced in area (compared to the area immediately upstream) which decelerates supersonic flow to increase static pressure—but which need not cause sonic or subsonic flow.

"Shock wave" is a discontinuity in supersonic flow across which flow properties abruptly change.

"Normal (90°) shock wave" is a shock wave across which there is sonic velocity.

"Final shock wave" is the normal shock wave which occurs in a supersonic diffuser.

"Throat" means a reduced area in a flow channel, as in an effuser or diffuser.

"Contour" means shape of the wall or walls of the flow channel, as in an effuser, diffuser or separator bend.

"Gaseous or gas stream" means a stream completely in the gas phase or one containing liquids and/or solids.

"Motive gas stream" means a gas stream at supersonic velocity which has appreciable kinetic energy.

"Low-pressure stagnant gas" means a low-velocity gas which has a pressure comparable to the static pressure of motive gas.

"Static pressure" means the pressure exerted in the direction perpendicular to the flow stream lines.

Briefly, then, the invention involves a method for separating condensable components from a multi-component gas stream which includes the steps of expanding the gas stream through a supersonic effuser to achieve low temperatures and low pressures in the supersonic gas stream and to form thereby condensed particles; separating the particles from the gas stream preferably by directing the gas stream to traverse a planar bend provided with a permeable wall to and through which the particles are inertially moved; decelerating the gas stream to subsonic flow through a diffuser and recovering a portion of the pressure of the gas stream; and introducing low-pressure stagnant gas into the supersonic motive gas stream in the supersonic portion downstream of the effuser throat. The stagnant gas may be introduced into the motive gas stream through a permeable wall or barrier arranged on the supersonic portion or through a pipe extending into the center of the motive gas stream in the supersonic portion. If necessary, the stagnant gas may be compressed before introducing it into the motive gas stream. Also, the divergence angle of the supersonic portion may be increased to reduce local static pressure and increase velocity of the gas stream downstream of the location of introduction of the stagnant gas. When it is necessary in certain applications to increase the static pressure of the gas stream sufficiently to drive the condensed particles through the permeable wall, the gas stream is decelerated and the pressure of the gas stream is increased upstream of the bend. The invention also includes apparatus for carrying out the method described supra.

A primary object of the present invention is, therefore, to provide improved method and apparatus for separating condensable components from a gaseous flow stream.

The above object and other objects and advantages of the present invention will be apparent from the following description when taken with the drawings wherein.

Figures 1, 2, 2A, 3:
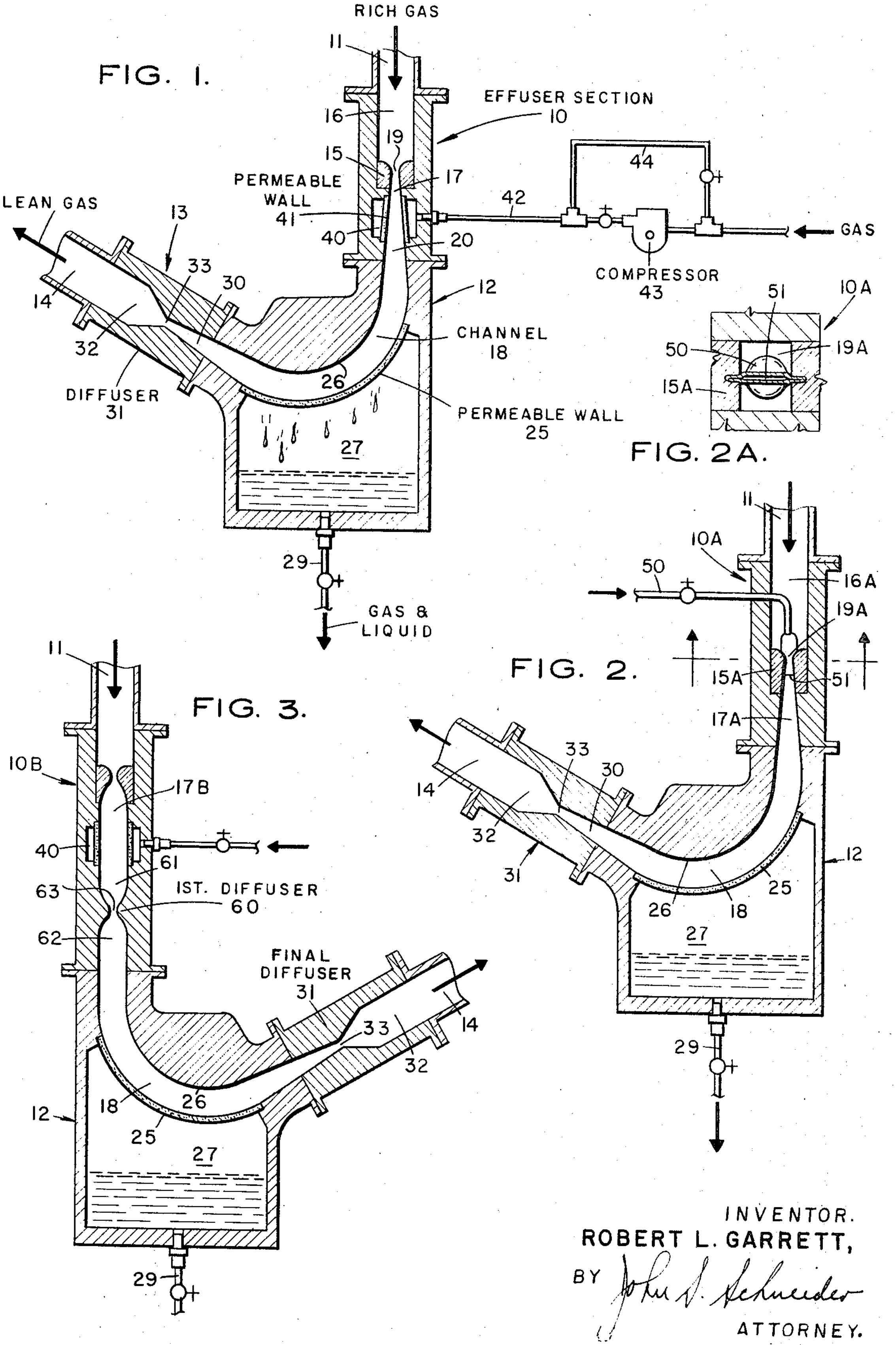
FIG. 1 is a side view illustrating one embodiment of the supersonic expansion separator of the invention.
FIG. 2 is a side view illustrating a variation in the embodiment of the invention illustrated in FIG. 1.
FIG. 2A is a view taken on lines 2A—2A of FIG. 2.
FIG. 3 is a side view of another embodiment of the supersonic expansion separator of the invention.

As shown in FIG. 1, the components of the supersonic expansion separator are an effuser section 10 connected at its subsonic end to a source of high-pressure gas through inlet conduit 11 at its supersonic end to a separation section 12. The supersonic end of a diffuser section 13 is connected to the down-stream end of separator section 12. The subsonic end of diffuser section 13 is connected to a gas stream discharge conduit 14.

Effuser section 10 includes a (replaceable) effuser 15 having a convergent subsonic section 16 connected to inlet conduit 11, and a divergent supersonic section 17 connected to a flow channel 18 of separation section 12. Effuser 15 also has an intervening sonic throat 19. The function of the effuser is to expand gas flowing therethrough essentially isentropic. The design of effusers of this type is well known to the art and may be according to principles described in DRL Publication No. 406 of the Defense Research Laboratories, University of Texas (1957) or the pamphlet by Kuno Foelsch, No. NA–46–235–2, published by North American Aircraft Corporation, May, 1946. Other references which describe effuser design methods for rectangular cross section configurations are, "An Accurate and Rapid Method for the Design of Supersonic Nozzles," Beckworth, J. E., and Moore, J. A., NACA Space TN 3322, February, 1955; "Nozzles for Supersonic Flow Without Shock Fronts," Shapiro, A. H., Journal of Applied Mechanics, Transactions ASME, vol. 66, p. A–93 (1944); "Supersonic Wind Tunnels—Theory, Design and Performance," J. Ruptash, UTIA Review No. 5, U. of Toronto, I vol. of Aerophysics, June, 1952; and "Nozzle Design," Puckett, A. E., Journal of Applied Mechanics, December, 1946, p. 265. A reference describing effuser design methods for circular cross-section configurations is "The Analytical Design of an Axially Symmetric Laval Nozzle for a Parallel and Uniform Jet," Foelsch, J., Journal of Aeronautical Sciences, March, 1949, p. 161 ff.

In gas streams expanded by such supersonic effusers, the temperature achieved can be low, dependent in part upon the amount of condensation occurring. Such temperatures can be predicted for simple flow systems using information given in The Dynamics and Thermodynamics of Compressible Fluid Flow, vols. 1 and 2, by Ascher H. Shapiro, The Ronald Press Company, New York.

The supersonic section 17 of effuser 15 includes a generally divergent straight flow path 20 of rectangular cross section. This "intermediate" section is used to provide drop coalescence in certain applications of the supersonic separator; however, it is not a necessary feature in all applications thereof. Flow path or channel 20 is made divergent in order to maintain the gas stream at high velocity. The design of a divergent channel of this type may be found in a number of publications. In the Journal of Applied Physics, June 14, 1946, an article by J. H. Keenan and E. P. Newmann, entitled, "Measurement of Friction in a Pipe for Subsonic and Supersonic Flow of Air," presents experimental data to substantiate theory on friction losses. An article by R. E. Wilson, entitled, "Turbulent Boundary Layer Characteristics at Supersonic Speeds—Theory and Experiment," Journal of Aeronautical Sciences, vol. 17, p. 585, presents a complete description of channel compensation.

Flow path of channel 18 is curved and preferably of rectangular cross section. It is formed of opposing side walls, an outer curved permeable wall 25 and an inner coplanar curved wall 26. Permeable wall 25 may be formed of permeable metal. Channel 18 is curved in design in accordance with principles set forth in an article by L. Liccini, entitled, "Analytical and Experimental Investigation of 90° Supersonic Turbine Passages Suitable for Supersonic Compressors and Turbines," National Advisory Committee for Aeronautics, RLM 9G07 (1949), or as in an article by E. Boxer et al., entitled, "Application of Supersonic Vortex Flow Theory to the Design of Supersonic Impulse Compressors or Turbine Blade Sections," National Advisory Committee for Aero-Dynamics, RLM 52B06 (1952). Channel 18 is also diverged in accordance with the equations and tables in the aforementioned article by R. E. Wilson. General information on this art, including circularly and rectangularly configured channels, may be found in texts such as vols. 1 and 2 of the aforementioned Shapiro reference, and for rectangular configurations alone, the aforementioned bulletin by J. Ruptash.

Permeable wall 25 is held in place by means of wall supports not shown. Liquid droplets and solid particles which separate from the gas stream pass through permeable wall 25 into a collection chamber 27.

A conduit 29 is connected to chamber 27 for the purpose of discharging material collected in chamber 27. The downstream end of channel 18 at the end of the bend or curve connects to the convergent supersonic section 30 of diffuser 31. Diffuser 31 also includes a divergent subsonic section 32 which connects to discharge conduit 14 and has an intervening sonic throat 33. General diffuser design information concerning contours, throat areas, lengths and other parameters thereof can be found in the text, Supersonic Inlet Diffusers and Introduction to Internal Aerodynamics, by Dr. Rudolf Hermann, published by Minneapolis-Honeywell Regulator Company, Minneapolis, Minnesota, and Minneapolis-Honeywell Regulator Company Ltd., Toronto, Canada, second edition. The diffuser can be made adjustable in its contour and throat area in order to obtain weak shock waves properly located within the convergent portion of the diffuser and a normal (final) shock wave at or near the diffuser throat. The reason for so locating these waves is to achieve maximum pressure recovery by decelerating supersonic flow.

As shown in FIGS. 1 and 3, a chamber or cavity 40 is arranged on the divergent supersonic section 17 of effuser 15. The wall 41 of effuser channel 20 at that location is permeable. A conduit 42 connects a source of low-pressure stagnant gas (not shown) to chamber 40. As illustrated in FIG. 1, that gas may be compressed by a compressor 43 arranged in conduit 42 or the compressor may be bypassed by conducting the gas through a bypass conduit 44. Suitable valves are provided for that purpose.

In the operation of the embodiment of FIG. 1, a high-pressure multicomponent (rich) gas containing condensable components is conducted through inlet conduit 11 into effuser 15. Expansion cooling occurs in effuser 15 as the gas stream attains supersonic velocities in divergent channel 20. Condensable components of the gas stream are condensed as particles. These particles (drops) are inertially moved toward the outer curvature (wall 25) of the bend in channel 18. Particles pass through the permeable wall 25 along with some entrained gas and volatile components into collection chamber 27. The remaining supersonic gas stream, now stripped of its condensable components, is decelerated to near zero velocity by final diffuser 31 and the pressure of the lean stripped gas approaches that of the rich inlet gas.

Supersonic flow channel 20 contains supersonic "motive" gas having appreciable kinetic energy. Cavity 40 accepts low-pressure "stagnant" gas through conduit 42. Permeable wall or barrier 41 within cavity 40 also defines part of the contour of channel 20. Stagnant gas from conduit 42 enters channel 20 through barrier 41 at a pressure slightly exceeding static pressure of the supersonic flow adjacent permeable barrier 41. (Static pressure at other points along channel 20 may exceed pressure of the stagnant gas in conduit 42 but that will not affect conditions adjacent barrier 41.)

Mixing of stagnant gas with motive gas in channel 20 results in increased pressure of the stagnant gas at the expense of the motive gas's recoverable pressure in final diffuser 31. Provided the stagnant gas is amenable to condensation, then particles condensed from the stagnant gas will be removed by inertial ejection in traversing the bend of channel 18 alnog with the condensate of the motive gas stream.

Stagnant gas may be compressed by compressor 43 if that gas needs to be pressurized for introduction into the motive gas stream. If no compression is needed, the compressor 43 may be bypassed by conducting the stagnant gas through bypass conduit 44.

In practical designing of an effuser section, i.e., if the pressure of the stagnant gas in conduit 42 is less than the selected optimum static pressure in supersonic channel 20 at the point of introduction of the stagnant gas through permeable barrier 41 and if mechanical compression is not desirable for any reason, then the divergence angle of the effuser ejector section 17 may be increased to reduce local static pressure and increase velocity adjacent the stagnant gas introduction site.

A different arrangement for introducing the stagnant gas into the motive gas stream is illustrated in FIGS. 2 and 2A. Instead of using the chamber 40 and permeable barrier 41, a thin pipe 50 provided with suitable valves extends into the subsonic section 16A of effuser 15A and protrudes through the sonic throat 19A thereof into the supersonic divergent channel 17A at the center or core of the supersonic flow stream. As seen more clearly in FIG. 2A, pipe 50 in channel 17A terminates in a channel wide slit opening 51. By means of pipe 50, stagnant gas is introduced into the core of the supersonic gas stream. Pressure in conduit 50 must exceed the static pressure in supersonic section 17A adjacent the point 51 where stagnant gas leaves the thin pipe 50. This arrangement would be preferred over the arrangement illustrated in FIG. 1 when it would be undesirable to increase boundary layer thickness or introduce an adverse pressure gradient at the wall of supersonic channel 17A. In some cases, both the arrangements illustrated in FIGS. 1, 2 and 2A for introducing stagnant gas into the supersonic flow gas stream might be advantageous. As in the description of operation of the FIG. 1 embodiment, a compressor may be employed to increase stagnant gas pressure sufficiently for its introduction into the motive gas stream.

In FIG. 3, an additional diffuser (first diffuser) 60 which includes a convergent supersonic channel 61, a divergent supersonic channel 62 and an intervening sonic throat 63 is arranged in effuser section 10B.

Downstream in the first diffuser 60 deceleration and pressure increase occurs by reducing the divergence (61) sufficiently to increase the static pressure to drive particles through permeable wall 25 in order to maintain a suitable back pressure in collection chamber 27 and in suitable process vessels, e.g., liquid stabilizers (not shown). For practical operation, the wall of channel 61 of reduced divergence (or convergence) would be adjustable to allow a range of divergence settings to accommodate various operating flow rates of stagnant gas, pressures, compositions, etc.

A first diffuser would be particularly useful with an isolated separator in a remote area (where power to operate a compressor would be unavailable or uneconomic) where gas from a stabilized liquid product would contain valuable liquefiable components which should be recycled through the supersonic separator. The stabilizer off-gas would be at a slightly lower pressure than the average supersonic static pressure but it could be introduced (ejected) into the higher than average pressure of channel 17B by creating, by further acceleration of the supersonic stream, a lower pressure region within channel 17B.

Various modifications may be made in the preferred embodiments of the invention shown and described herein within the spirit and scope of the appended claim.

Other supersonic separator apparatus and techniques may be utilized with the concepts disclosed herein such as those illustrated and described in the following copending United States patent applications: Ser. No. 730,371, entitled, "Supersonic Flow Separator," by Robert L. Garrett, filed May 20, 1968; Ser. No. 730,375, entitled "Triangular Supersonic Flow Separator," by Robert L. Garrett and William J. McDonald, Jr., filed May 20, 1968; Ser. No. 730,373, entitled, "Supersonic Flow Separator With Film Flow Collector," by Robert L. Garrett, filed May 20, 1968; and Ser. No. 730,374, entitled, "Supersonic Flow Separator With Admixing," by Robert L. Garrett and William J. McDonald, Jr., filed May 20, 1968.

Having fully described the apparatus, method, objects and advantages of my invention, I claim:

1. A method for condensing and separating components from a multicomponent gas stream comprising:

expanding said gas stream through a supersonic effuser to achieve low temperatures and low pressures in the supersonic gas stream and thereby form condensed particles;

separating said particles from said gas stream;

decelerating said gas stream to subsonic flow through a supersonic diffuser and recovering thereby as pressure a portion of the energy of said gas stream; and introducing low pressure stagnant gas into the supersonic motive gas stream through a permeable barrier.

2. A method as recited in claim 1 including decelerating said gas stream following expansion thereof and prior to separation of said condensed particles from said gas stream to increase the static pressure of said gas stream.

3. A method as recited in claim 1 including compressing said low-pressure stagnant gas prior to introduction thereof into said motive gas stream.

4. A method for condensing and separating components from a multicomponent gas stream comprising:

expanding said gas stream through a supersonic effuser to achieve low temperatures and low pressures in the supersonic gas stream and thereby form condensed particles;

separating said particles from said gas stream;

decelerating said gas stream to subsonic flow through a supersonic diffuser and recovering thereby as pressure a portion of the energy of said gas stream; and introducing low pressure stagnant gas into the supersonic motive gas stream through a pipe protruding into the center of said motive gas stream.

5. A method as recited in claim 4 including compressing said low-pressure stagnant gas prior to introduction thereof into said motive gas stream.

6. A method as recited in claim 4 including decelerating said gas stream following expansion thereof and prior to separation of said condensed particles from said gas stream to increase the static pressure of said gas stream.

7. Apparatus for separating condensable components from a multicomponent gas stream comprising:

a supersonic effuser capable of expanding said gas stream to achieve low temperatures and low pressures in a motive gas stream and to form thereby condensed particles in said motive gas stream;

separation means adapted to separate said particles from said motive gas stream;

a supersonic diffuser capable of decelerating said supersonic gas stream to subsonic flow to recover as pressure a portion of the energy of said gas stream; and means for introducing low pressure stagnant gas into said motive gas stream including:

a permeable barrier, a closed chamber surrounding said permeable barrier, and means for feeding said low-pressure stagnant gas to said chamber.

8. Apparatus as recited in claim 7 in which the contour of the flow channel through which the supersonic gas stream flows diverges and said divergence angle increases sufficiently to reduce local static pressure and increases velocity of said gas stream adjacent to and downstream of said means for introducing said low-pressure stagnant gas.

9. Apparatus as recited in claim 7 including means for compressing said low-pressure stagnant gas prior to introduction thereof into said motive gas stream.

10. Apparatus for separating condensable components from a multicomponent gas stream comprising:

a supersonic effuser capable of expanding said gas stream to achieve low temperatures and low pressures in a motive gas stream and to form thereby condensed particles in said motive gas stream;

separation means adapted to separate said particles from said motive gas stream;

a supersonic diffuser capable of decelerating said supersonic gas stream to subsonic flow to recover as pressure a portion of the energy of said gas stream; and means for introducing low pressure stagnant gas into motive gas stream including:

a pipe extending into said effuser approximately at the sonic throat thereof; and means for feeding said low-pressure stagnant gas to said pipe.

11. Apparatus as recited in claim 10 in which the contour of the flow channel through which the supersonic gas stream flows diverges and said divergence angle increases sufficiently to reduce local static pressure and increase velocity of said gas stream adjacent to and downstream of said means for introducing said low-pressure stagnant gas.

12. Apparatus as recited in claim 10 including means for compressing said low-pressure stagnant gas prior to introduction thereof into said motive gas stream.

References Cited

UNITED STATES PATENTS 1,519,428 12/1924 Wilisch -------------- 55—461

OTHER REFERENCES

Cornvich, et al.: "Handbook of Supersonic Aerodynamics," section 17, NAVWEPS Report 1488 (vol. 6), January 1964, pp. 237–240 and 273–275.

REUBEN FREIDMAN, Primary Examiner

C. N. HART, Assistant Examiner

U.S. Cl. X.R.

55—277, 461, 421